Patented June 24, 1930

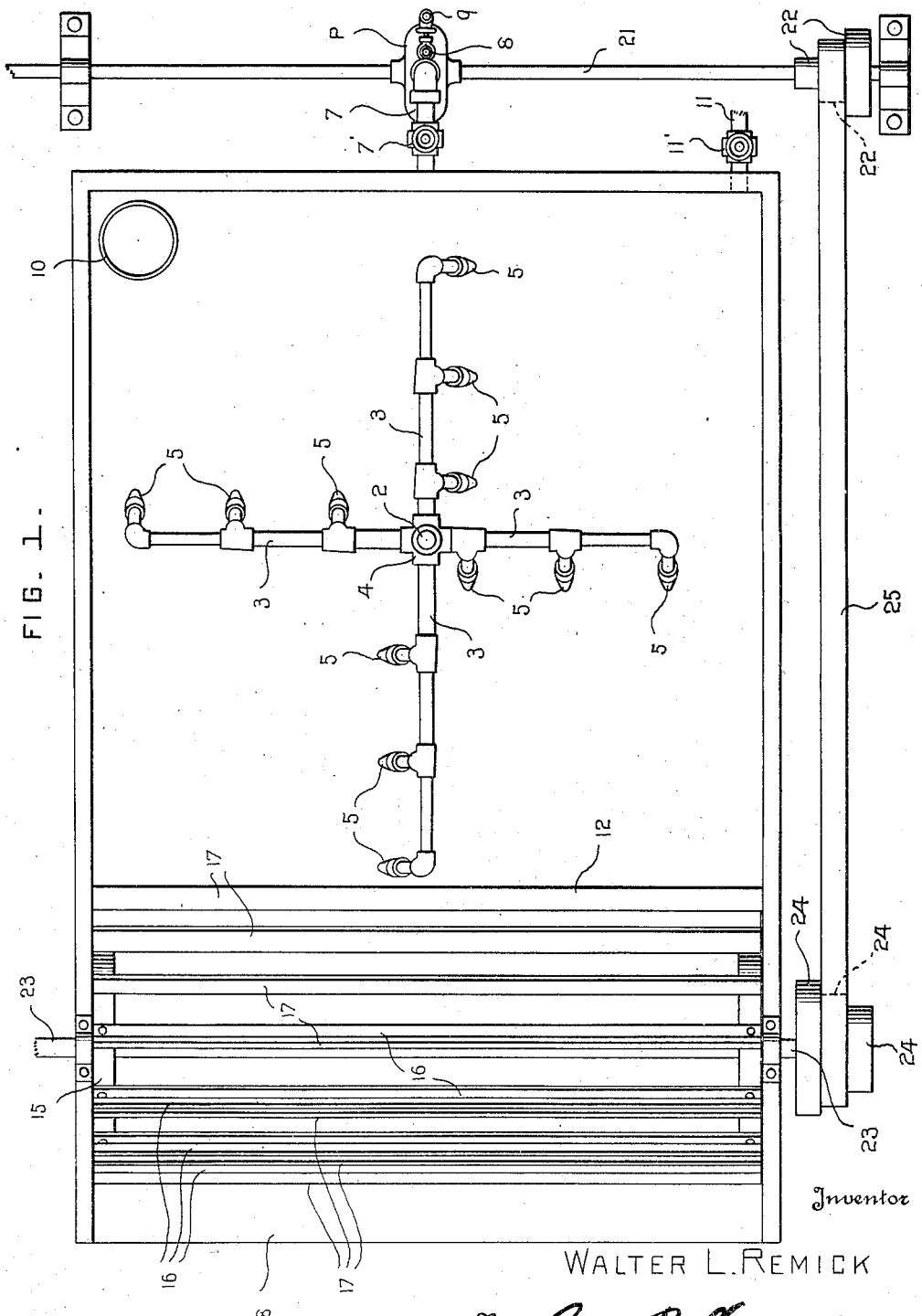

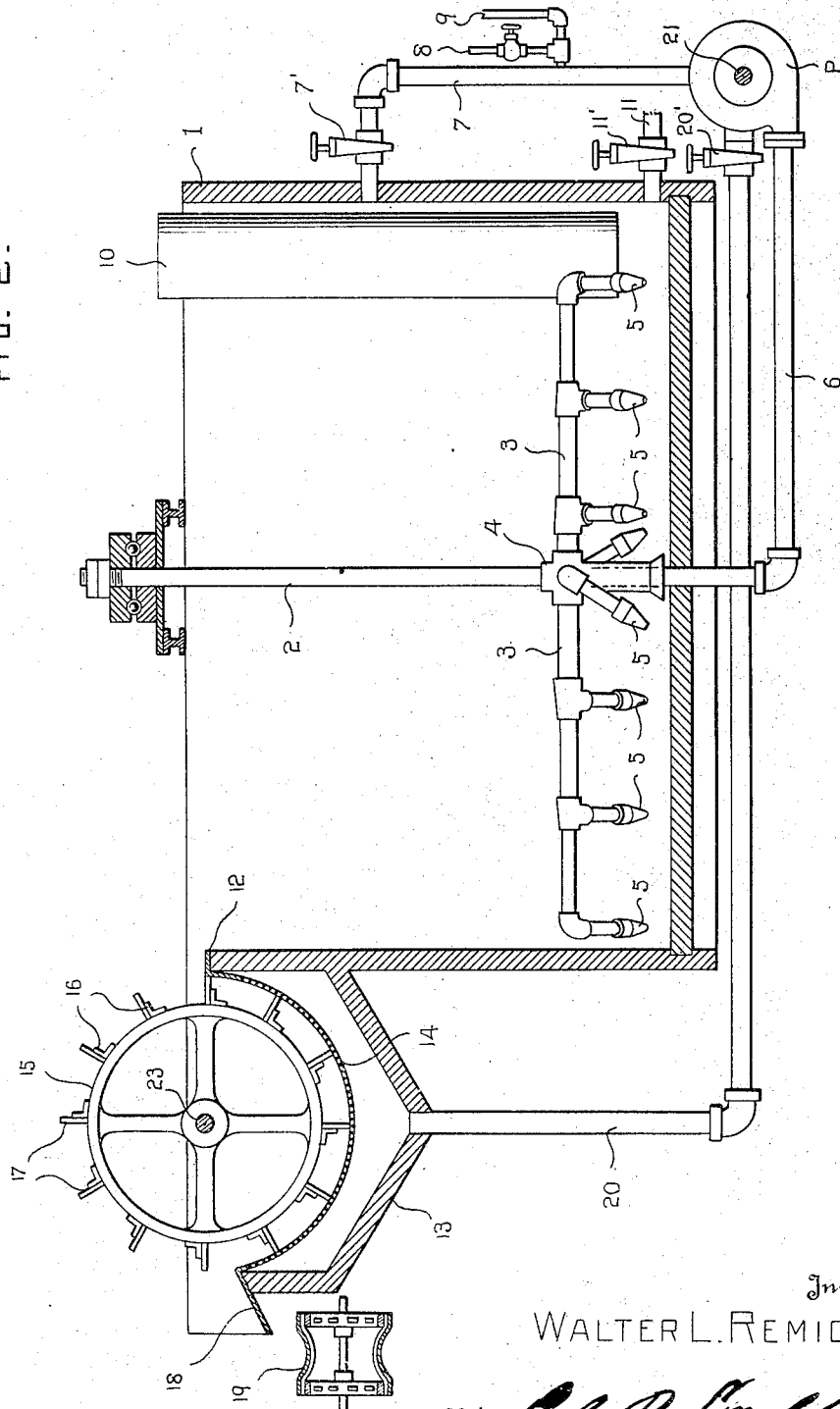

1,767,400

UNITED STATES PATENT OFFICE

WALTER L. REMICK, OF HAZLETON, PENNSYLVANIA

PROCESS OF THE SEPARATION OF COMBUSTIBLE MATERIAL FROM ITS ASSOCIATED NONCOMBUSTIBLE MATERIAL

Application filed May 27, 1929. Serial No. 366,423.

My invention consists in a new and useful improvement in the process of the separation of combustible material from its associated non-combustible material, and is designed more particularly for the recovery of coal from a mixture of coal and slate. The particularly novel feature of my improved process is the separation of the coal by means of floatation, accomplished by the combined effect of an upward fluid current and the buoyancy of the oiled finer coal particles affected by air supplied thereto.

My process consists in subjecting the mixture of coal and slate to the effect of an upward current of fluid in a tank, recovering the floated coal fines, agitating them with oil, returning the oiled fines to the fluid mass, causing the suspension of the finer particles of slate in the fluid mass, and dewatering the floated mass of coal.

In the drawings filed herewith, I have illustrated an apparatus by which my improved process can be practiced, but it is to be distinctly understood that I do not consider my invention limited by the description and illustration herein made, but refer for its scope to the claims appended hereto.

In the drawings:

Figure 1 is a top plan view of the apparatus.

Figure 2 is a vertical section.

In the drawings, the numeral 1 designates a rectangular fluid containing tank. Suitably supported and centrally disposed relative to the tank 1 there is the vertical, rotatable shaft 2. Mounted upon the lower end of the shaft 2 are the horizontally disposed, outwardly extending, hollow arms 3 connected with the cross 4 and provided with tangentially directed, downwardly disposed nozzles 5. A pipe 6 communicates with the nozzles 5 through the cross 4 and arms 3. This pipe 6 is connected with the discharge side of the centrifugal pump P. I provide an intake pipe 7 communicating with the interior of the tank 1, connected to the intake side of the pump P, and provided with the valve 7'. Connected with the pipe 7 are the pipes 8 and 9 for the supply of air and oil respectively. The tank 1 is provided with a feed shell 10 extended downwardly into the tank 1 and having its open discharge end near the bottom of the tank 1 slightly above the plane of the nozzles 5. The tank 1 is also provided at its bottom with a discharge pipe 11 having the valve 11'. Along the top of one side of the tank 1 there is provided an overflow lip 12.

Disposed alongside of the tank 1 adjacent this overflow lip 12, there is a dewatering device comprising a shallow tank 13 provided with a cover, consisting of a perforated screen 14. Suitably mounted above this screen 14 is the rotatable drum 15 carrying longitudinal scraper bars 16 provided with squeegees 17, the parts being so disposed that rotation of the drum 15 causes the squeegees 17 to travel over the screen 14 in close contact therewith. The tank 13 is provided on the outerside with the discharge lip 18, below which I provide a suitable conveyor 19. The tank 13 is provided at its bottom with a pipe 20 having a valve 20' and connected with the intake side of the pump P.

I provide a suitable drive shaft 21 for driving the pump P, and having thereon power pulleys 22 of varying diameters. I provide the drum 15 with a drive shaft 23 having thereon pulleys 24 of varying diameters, the shaft 23 being driven by the shaft 21 by means of a belt 25. Different speeds for the drum 15 may be obtained by selective ratios of the pulleys 22 and 24.

From the foregoing description of the details of construction of the apparatus for practicing my process, its use and operation will be obvious. Mixed coal and slate are fed into the tank 1 through the feed shell 10, and are delivered on the bottom of the tank 1. The arms 3 with nozzles 5 revolve under impulse of water supplied by pump P, the water discharged by the nozzles 5 causing an upwardly flow in the tank 1. The coal and slate are kept in suspension in the zone between the level of the pump intake pipe 7 and the bottom of the tank 1. Above the level of the pipe 7, there is an upward current due to the amount of water that is allowed to overflow the lip 12, pass through the dewatering device and return to the tank 1 through the pipe 20. The fact that all of the coal and slate below the pipe 7 is in suspension makes it possible for the slate to settle to the bottom of the tank 1, so that it will be seen that a certain degree of separation is due to gravity. However, the tendency is for the finer particles of slate to rise with the coarser coal.

The slower upward current in the zone above the pipe 7 would, without the use of oil, raise fine coal particles (the fineness depending upon the velocity of the upward current) and a certain amount of extremely fine slate particles would overflow with the coal particles. If the particles of coal which overflow are larger than the mesh of the screen 14, they would not pass through but would be recovered by the dewatering device. Any particles of slate which overflow with the coal would be so small that they would pass through the screen 14 and return to the tank 1 with the finer particles of coal.

If all of the circulation of the fluid mass were compelled to go over the overflow lip 12 and through the dewatering device, by closing the valve 7' in the pipe 7, there would still be a good separation of coal and slate. This separation would be decreasingly effective on progressively smaller sizes, since the upward current would be adjusted to raise the largest particles.

The addition of oil and air to the process operating as above described is accomplished by introducing air and oil through pipes 8 and 9.

The effect of adding air and oil in the operation of the process is as follows: The finer particles of coal, returning through the dewatering device and pipe 20 to the pump P, are coated with oil, by agitation with the oil in the pump P, and are discharged through the nozzles 5 on the bottom of the tank 1, intimately mixed and agitated with air bubbles. In rising through the suspended coal and slate in the tank 1, the finer oiled coal particles act as collecting agents for the larger coal particles. The air bubbles become attached to the oiled particles, and these finer particles together with the larger particles to which they adhere are lifted to the surface as froth. This froth passes over the lip 12 and to the screen 14. A small portion of the finer particles of coal which has not previously passed through the pump P passes through the screen 14, with the finer particles of slate, and returns through the pump P to repeat the previous described process.

The effect of the return of the finer particles of slate is to build up the density of the circulating fluid, thereby increasing the ratio between the settling velocities of the coal and slate suspended in the tank 1. The result is to bring about a more clean-cut gravity separation. This is, of course, independent of the action of the oil and air, although it might bring about a more effective flotation of the coagulated coal.

This is illustrated by the following table, showing the change in the settling ratio as the density is increased by the return of the finer slate particles. Coal is assumed to have a specific gravity of 1.6 and slate a specific gravity of 2.6. Ratio of weight of coal to slate in a liquid of specific gravity 1.0=2.7. Assume that enough fine material is circulated through the screen 14 to raise the specific gravity of the fluid progressively to 1.2, 1.3, 1,4 and 1.5.

| Sp. gr. of fluid | Approximate settling ratio of coal and slate |
|---|---|
| 1.0 | 2.7 |
| 1.2 | 3.5 |
| 1.3 | 4.3 |
| 1.4 | 6.0 |
| 1.5 | 11.0 |

We aproach a condition where the coal would float and the slate would sink, giving an absolute gravity separation. In actual practice, this condition is not attained, since slate is being continually withdrawn from the bottom of the tank 1, and enough of the finer slate particles are removed to prevent the building up of extremely high densities.

The result which my process does attain is a combined gravity and oil flotation separation. The advantage of this combined action is that there is a far superior separation of the fine coal and slate particles as compared with the purely hydraulic classification effected without the use of oil and air.

The coal and the finer particles of slate are carried upward by the current, and the coarser particles of slate remain upon the bottom of the tank 1. It is to be particularly noted that the finely divided particles of un-oiled coal and slate which are floated upwardly by the moving current in the tank 1, pass through the screen 14 and tank 13 and are drawn by the action of the pump P through the pipe 20 into the pump P and are returned thereby to the tank 1. It is to be noted that the coal fines being drawn into the pump P are agitated with the oil supplied through the pipes 9 and 7 to the pump P. Thus it is apparent that only the finer particles of the coal are oiled. In this respect, my improved process is unique in flotation processes. It has been proven by experience that the oiled fines together with the air bubbles pick up the coarser coal particles which are not oiled and float them to the surface. I claim a point of superiority for my process over other flotation processes, in this feature, as the amount of oil required is reduced to a minimum. In other flotation processes, all the coal particles are oiled, which consumes a larger amount of oil. It has been found by experiments that when using this improved process wherein the un-oiled fines pass through the screen to the pump where they are oiled, they adhere to the coarser particles and the fines adhering thereto will not pass through the screen, even if the holes in the screen are larger than the holes in the screen through which the coal was screened previous to subjecting it to my process.

It is to be particularly noted that, as above mentioned, the finer particles of slate and other refuse material are returned by the circulating liquid to the tank 1. As is well understood, the oil which is supplied to the pump P coats the finer particles of coal but does not adhere to the particles of slate and other refuse. The fact that by my process the particles of slate and other refuse returning to the liquid mass in the tank 1 increase the specific gravity of said mass is an extremely important and valuable feature of my process.

Another feature having to do with the coal floated by my process is the large size of the particles which are floated. In anthracite collieries, it is the custom to reject and not market sizes of coal that pass through a $\frac{3}{32}$nd inch round hole. It is highly advantageous that all coal of this size shall be floated. If it were impossible to do this, it would be necessary to grind the coal to a finer size, which process would entail expense that might be prohibitive. Other flotation processes have been unable to float particles larger than about 1/50th of an inch, on a commercial scale. My process will float all of the $\frac{3}{32}$nd inch and still larger sizes, if necessary, for the following reasons:

As explained above, the air bubbles and the fines having been agitated with the oil in the pump and thereby become oiled, adhere to the coarser particles of coal and exert a lifting effect thereon. In addition, there are two other influences which give an added lifting effect:

1. Due to the action of the water from the nozzles 5, a large amount of fine coal and slate is continually in suspension between the bottom of the tank 1 and the pump intake pipe 7. A certain amount is also suspended between the pipe 7 and the floating surface, at the lip 12. This suspended matter, mixed with the water, forms a fluid of specific gravity higher than that of water, the actual specific gravity varying directly with the proportion of solids in suspension in the water. The result is an increase in the buoyancy or lifting effect of the fluid on the coal.

2. In addition to this buoyancy, there is the lifting effect of the upwardly flowing current of water from the nozzles 5. It is conceivable that the combined effect of these two forces might in itself overcome the gravity of the coal and float it away from the slate. However, it is not necessary that this should be done, as the lifting effect of the air bubbles supplies the buoyancy for raising the coal to the surface.

The principles hereinbefore set out are radically different from those involved in the operation of other flotation processes, which have been designed primarily for the flotation of sulphides from ores. Sulphide flotation is a process requiring careful selection of flotation agents and delicate adjustments of the apparatus. All sulphides are floated away from a downwardly moving current of ore and water. This seems necessary in the case of ore, but has been found to be unnecessary in cleaning coal. My process is designed for floating coal.

Having described my invention, what I claim is:

1. The process of the separation of combustible material from its associated non-combustible material which consists in discharging a mixture of combustible and non-combustible material into a liquid mass, separating the finer particles of the combustible material from the coarser particles of the combustible material and from the mass, agitating said finer particles with oil, and re-introducing said oiled particles into the liquid mass.

2. The process of separating large and small particles of coal from non-combustible matter in a liquid medium which consists in separating the large coal from the coal fines, removing the fines and coating them with oil independently of the large particles of coal, re-introducing the oiled fines into the liquid medium to cause them to adhere to the coarser coal particles and carry them upwardly in said liquid medium and separate them from the non-combustible material.

In testimony whereof I affix my signature.

WALTER L. REMICK.